US006687115B2

(12) United States Patent
Carter

(10) Patent No.: US 6,687,115 B2
(45) Date of Patent: Feb. 3, 2004

(54) FILM CAPACITOR FOR HIGH TEMPERATURE APPLICATIONS

(75) Inventor: Mark A. Carter, Casselberry, FL (US)

(73) Assignee: Dearborn Electronics, INC, Longwood, FL (US)

( * ) Notice: Subject to any disclaimer, the term of this patent is extended or adjusted under 35 U.S.C. 154(b) by 0 days.

(21) Appl. No.: 10/237,444

(22) Filed: Sep. 9, 2002

(65) Prior Publication Data

US 2003/0053285 A1 Mar. 20, 2003

Related U.S. Application Data

(60) Provisional application No. 60/317,917, filed on Sep. 7, 2001.

(51) Int. Cl.⁷ .............................. H01G 4/03; H01G 4/32
(52) U.S. Cl. .................... 361/323; 29/25.42; 361/301.5
(58) Field of Search ........................... 361/301.1, 301.2, 361/301.3, 301.5, 311, 323; 29/25.42

(56) References Cited

U.S. PATENT DOCUMENTS

| 4,185,148 A | 1/1980 | Sato et al. |
|---|---|---|
| 4,226,011 A | 10/1980 | Hunt |
| 4,325,167 A | 4/1982 | Rosenberg |
| 4,554,612 A | 11/1985 | Childs |
| 5,072,329 A | 12/1991 | Galvagni |
| 5,334,411 A | 8/1994 | Pepin |
| 5,870,275 A | 2/1999 | Shiono et al. |
| 6,094,337 A | 7/2000 | Ueda et al. |
| 6,127,042 A | 10/2000 | Tamic |

OTHER PUBLICATIONS

PCT International Search Report dated Mar. 11, 2003 of International Application No. PCT/US02/28553 filed Sep. 9, 2002.
Bellavia, Andy, How to Specify Polypropylene Film Capacitors in AC of Pulse Applications, Evox—Rifa, Inc. 1997.
Johanson, Jan–Ulf, EMI Capacitor Design and Performance, Evox–Rifa, Inc. 1997.
Evox–Rifa, Film Capacitors 2001 Catalog by Dielectric, Evox–Rifa Inc. pp. 12–17.

Primary Examiner—Anthony Dinkins
Assistant Examiner—Eric Thomas
(74) Attorney, Agent, or Firm—Maine & Asmus

(57) ABSTRACT

A process for extending the operating temperature limit of a polypropylene film capacitor to greater than 105° C., by use of a post assembly curing process of placing the capacitor in a 10 Torr or less pressure environment, preferably less than 1 Torr, and slowing heating it at a rate of less than an average rate of 5° C./hour to a peak temperature of about 10 to 20 degrees higher than the intended operating temperature, the peak temperature being not more than preferably 180° C.

30 Claims, No Drawings

FILM CAPACITOR FOR HIGH TEMPERATURE APPLICATIONS

This application relates and claims priority to pending U.S. application Ser. No. 60/317,917 filed Sep. 7, 2001.

BACKGROUND

1. Technical Field of the Invention

This invention relates to film capacitors; and more particularly to polypropylene film capacitors for use in high temperature applications.

2. Background Art

Polypropylene is an extremely versatile polymer. It is used in both plastics and fiber. It has a melting temperature of 160° C., (433.5 K or 320° F.). Structurally, it is a vinyl polymer, and is similar to polyethylene, only that on every other carbon atom in the backbone chain has a methyl group attached to it. Polypropylene can be made from the monomer propylene by Ziegler-Natta polymerization and by metallocene catalysis polymerization.

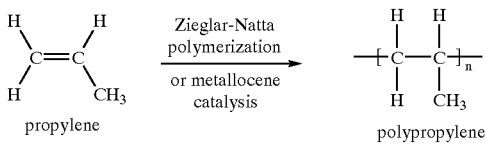

Capacitors fabricated by prior art methods using known dielectric films composed of polypropylene have maximum operating temperatures approximately between +85° and +105°. Above these temperatures, other types of capacitors must be used, such as those using high temperature polymer films, ceramic, wet and dry tantalum, mica, and aluminum electrolytic capacitors, which are much more costly to produce.

Some examples of patent art providing useful context for understanding the invention are: Ueda's U.S. Pat. No. 6,094,337, *Polypropylene Film and Capacitor Made by Using it as a Dielectric*; Tamic's U.S. Pat. No. 6,127,042, *Capacitor having a Polypropylene Dielectric, and a Metallized Film for making such a Capacitor*, and Sato's U.S. Pat. No. 4,185,148, *Process for Producing the Polypropylene Film for Electrical Appliances*.

As Ueda states, ". . . the polypropylene film wound with an electrode is generally annealed at a certain temperature, and thereby moderately thermally shrunk for tightening the winding to maintain its shape and to squeeze out the air between film layers, and in this case if the heat shrinkage is too large, the device may be deformed, lowering the capacity of the capacitor, or it may be destroyed. If the heat shrinkage is too small, the tightening of the winding may be insufficient, or the dielectric loss may increase to destroy the device when used at high temperature for a long time." Thus, if the temperature is too high or the capacitor is exposed to the high temperature for too long, the polypropylene anneals to such an extent that the capacitor is compromised. Ueda discloses the use of a biaxially oriented film with improved dielectric properties, but nowhere questions or challenges conventional operating temperature limits of 105 degrees Centigrade.

Various commercial sources of electronics components offer polypropylene film capacitors, all listing an upper temperature limit of 105 degrees Centigrade. Higher temperature capacitors such as ceramic and tantalum being significantly more expensive, clearly there is a need for a process that would extend the useful operating temperature range of the relatively inexpensive polypropylene film type capacitors while maintaining their physical and electrical properties.

SUMMARY OF THE INVENTION

It is an object of the present invention to provide metallized polypropylene film capacitors that are capable of a useful operating life at a temperature greater than 105° C., and even greater than 125° C.

It is a further object to provide a method for production of polypropylene film capacitors with higher than present operating temperature limits, using conventional materials and equipment. It is yet another object of the invention to provide such capacitors while maintaining high stability, high insulation resistance, and low losses. It is a yet further object of the invention to provide such a capacitor having low dielectric absorption and excellent AC performance.

It is another object of the invention to provide a monolithic polypropylene film capacitor of higher than previous operating temperatures by the process comprising the steps of: vapor depositing metal electrodes on polypropylene dielectric film; winding the film; applying solderable or weldable spray material to the end of each of the electrodes using metallizing equipment, thereby forming a capacitor; and then slowing heating the capacitor in an evacuated oven to a peak temperature of about 10 to 20 degrees higher than the intended operating temperature, the peak temperature being between about approximately 115° C. (388.15 K) and an upper limit of approximately 200° C. (473.15 K) and maintaining the peak temperature for a period of time.

It is still another object of the invention to provide such a monolithic polymer capacitor wherein said polypropylene dielectric film is commercially available. It is yet another object of the invention to provide such a monolithic polymer capacitor wherein said capacitor has a capacitance of between 0.001 and 800 microfarads ($\mu F$).

It is a still further object of the invention to provide such a monolithic polymer capacitor wherein said capacitor is heated at an average rate over the curing process of not more than about approximately 5° $C./_{hour}$, up to a peak temperature of not more than 200° C., and preferably not more than about 180° C. It is a yet further object of the invention to provide such a monolithic polymer capacitor wherein the final peak temperature curing time is not less than about approximately 1 hour. It is still another even further object of the invention to provide such a monolithic polymer capacitor wherein the capacitor has a maximum operating temperature limit greater than about approximately 105° C. (378.15 K), and preferably at least about 125° C., which is at least about 10 degrees lower than the peak curing temperature, and preferably about 20 degrees or more lower.

It is another further object of the invention to provide such a monolithic polymer capacitor wherein the step of winding further comprises using a standard capacitor winding machine. It is still another further object of the invention to provide such a monolithic polymer capacitor wherein said capacitor winding machine has continuous tension control.

Other objects and advantages of the present invention will become readily apparent to those skilled in this art from the following detailed description, wherein we have shown and described only a preferred embodiment of the invention, simply by way of illustration of the best mode contemplated by us on carrying out our invention.

DESCRIPTION OF THE PREFERRED EMBODIMENT

The preferred embodiment product of the present invention is a wound film polypropylene capacitor, heat treated in the post fabrication stage, the result of which is a higher than expected useful operating temperature limit. In accordance with the preferred embodiment, the capacitors are constructed with a single layer or multiple layers of polypropylene dielectric film capacitor grade that is commercially available for the purpose from several sources. Metal electrodes are vapor-deposited onto the film. The layers are wound under continuously controlled tension in a convoluted roll with electrodes extending beyond the dielectric film in the manner common in the industry. The capacitors are wound using a standard capacitor winding machine, with continuous tension control. For film widths of one half inch, a tension of 23 grams is typical. For a film width of two inches, tension may be set at about 400 grams. A solderable or weldable spray material is applied using metallizing equipment such as electric arc, electron beam, sputtering or flame end spray equipment to the end of each electrode, as is commonly done. Other variations commonly employed in the art are within the scope of the invention as to the basic fabrication process.

A final step in the methodology is then executed. The capacitors are gradually heated in a vacuum to a peak temperature determined by the desired maximum operating temperature of the finished capacitor. This step is susceptible to a variety of embodiments.

In one embodiment, the capacitors are placed in a evacuated oven. An evacuated oven is any heat retaining chamber in which a vacuum has been created. In one embodiment, the pressure inside the oven is about 500 $\mu$m Hg (micrometers of Mercury) which is equivalent to about 0.000658 atm (atmospheres). Those skilled in the art will realize that the invention could be practiced at higher pressures that are still substantially less than ambient pressure, for example at 1–10 mm Hg and higher, which is 1–10 Torr; although lower pressures yield relatively better results. The temperature control for the oven environment is then raised to a first intermediate temperature of about approximately 70° C. (343.15 K). Due to the mass, volume and heating capacity of the oven, this results in a slow temperature rise of the oven interior from ambient to the 70 degree set point over a period of about approximately two hours, or at a maximum first phase rate of about 20°–30° $C./_{hour}$. The oven temperature is maintained at 70° C. for a time to insure that the capacitor temperature is fully stabilized and the pressure has permeated the capacitor windings fully. In one embodiment, the oven temperature and pressure is maintained at this temperature setting for approximately 16 hours.

The oven set point temperature is then raised to about approximately 105° C. (378.15 K), while the pressure is maintained at the original 500 micron setting. This temperature rise of the oven interior may take place over about approximately 1 hour, or again at a maximum rate of about 20°–30° $C./_{hour}$. The oven temperature and pressure are maintained at these settings for a time, again to insure the fullest permeation and stability of the capacitors at this temperature and pressure. In one embodiment, the temperature is maintained at about approximately 105° C. for 16 hours. During this heating under low pressure process, volatile contaminants and moisture are removed. The low pressure level of the oven may then be released. The temperature in the environment is then raised to and maintained for a time at the peak temperature for the final step in the curing process.

In an alternative embodiment the capacitor is heated in a computer controlled vacuum oven set at about 500 $\mu$m Hg gradually to the selected peak temperature. The rate of the temperature rise in the oven may be limited by automatic control to on average not more than about approximately 5°$/_{hour}$ over the course of the entire curing process. The gradual increase temperature can take about approximately 36–40 hours to reach maximum peak temperatures. The total time must be sufficient to insure the removal of all volatile contaminants, such as organic residue from the manufacture of the polymer tape, and moisture, and to increase the temperature of the oven to the peak temperature without damaging the polypropylene or prejudicing the seating thereof.

The peak temperature is maintained for at least one hour, preferably up to four hours. The peak temperature is a selected temperature of between at least 115° C. and 200° C., of at least 10 degrees and preferably 20 or more degrees above the intended operating temperature. In one embodiment, the peak temperature is approximately 10° or more higher than the highest intended operating temperature. The higher the desired operating temperature for the capacitor, the higher the peak temperature. Peak temperatures below 115° C. would not yield operating temperatures higher than those of capacitors produced by known methods. Peak temperatures in excess of 200° C. may result in degradation or decomposition of the polypropylene film. Peak temperatures limited to not more than about 180° C. provides acceptable yields in production batches. This final step may be performed at ambient pressure in an air-circulating oven providing uniform temperature distribution. The heat may then be removed and the capacitors may slowly be allowed to return to ambient temperature.

The temperature excursion in this annealing process fuses the plastic layers together, virtually forming a monolithic material, and thereby yields metallized polypropylene capacitors with a useful operating temperature limit greater than prior art polypropylene capacitors having a high temperature limit of 105° C. This maximum operating temperature limit obtained by the preferred embodiment methods of the present invention is about approximately between 150° C. and 160° C. This is a very significant and unexpected difference in performance over the prior art.

Single capacitor elements may be made according to the present invention with a capacitance range between about approximately 0.01 $\mu$f to about approximately 800 $\mu$f, a capacitance tolerance of ±20%, ±10%, ±5%, or 2% and voltage rating of between approximately 400 VDC and approximately 1200 VDC. A/C ratings of from about approximately 50 $^1/_{AC}$ to about approximately 500 $^1/_{AC}$ have also been achieved. The case may be a hermetically sealed metal enclosure with an insulating sleeve. Non-hermetic designs, however, work equally well. The capacitors produced may, or may not have leads. The leads may be composed of copper, or copper clad steel. It would be clear to one skilled in the art that the leads could be composed of other conductive materials, such as solder coated solid wire that is malleable and has sufficient tensile strength to withstand in excess of 5 lbs. (2.3 Kg) for greater than one minute without physical damage.

A 2000 hour life test of 100 product samples of both hermetically sealed and non-hermetic designs, was conducted, using a DC power supply, with the capacitors wired in parallel and placed in an air-circulating oven. The temperature was set at 125° C., and the test run at 140 percent of the rated voltage in order to accelerate the test. There were zero failures. Temperature cycling from −55° C. to +125° C. for 500 cycles showed no degradation.

Another embodiment of the invention is a monolithic polymer capacitor produced by the process comprising the steps of: vapor depositing metal electrodes on polypropylene dielectric film; winding the film in the conventional manner; applying solderable or weldable spray material or other terminal connections to an exposed end of each of the electrodes such as by using metallizing equipment, thereby forming a capacitor; and curing the capacitor by gradually heating it in an evacuated oven to a peak temperature between about approximately 115° C. (388.15 K) and about approximately 200° C. (473.15 K), and then maintaining the peak temperature for a period of time. The polypropylene dielectric film is commercially available. The capacitor produced by this method has a capacitance of between 0.001 and 800 microfarads ($\mu$F). During the process the capacitor is heated at an average rate of not more than about approximately 5° C./$_{hour}$, and not more than a maximum rate of 30 degrees/hour, and held at the peak temperature for a period of time of not less than about approximately 1 hour and preferably 4 hours. In this embodiment, the step of winding uses a standard capacitor winding machine that has continuous tension control.

Other examples within the scope of the invention include a monolithic polymer capacitor produced by the process consisting of the steps of vapor depositing metal electrodes on polypropylene dielectric film; winding the film; applying a terminal connection to an exposed end of each electrode thereby forming a capacitor; and curing the capacitor by the following steps: placing the capacitor in a low pressure environment, and gradually heating the capacitor to a peak temperature between about approximately 115° C. (388.15 K) and about approximately 200° C. (473.15 K) and maintaining the peak temperature for a period of time, typically 1 to 4 hours.

The capacitor is heated at a rate of not more than about approximately 5° C./$_{hour}$ and at a peak rate of not more than 30° C./$_{hour}$. The peak temperature is preferably between about approximately 125° C. (398.15 K) and about approximately 180° C. (453.15 K). The peak temperature is at least about approximately 10° C. higher than the desired operating temperature. The low pressure environment is maintained at not more than about 10 Torr, more preferably not more than about 2 Torr, and most preferably not more than about 1 Torr.

The steps of curing the capacitor may consist of the sub steps of placing the capacitor in an oven, creating the low pressure environment in the oven; heating the capacitors to a first intermediate temperature; maintaining the first intermediate temperature for about approximately 16 hours; heating the capacitor to a second intermediate temperature; maintaining said second intermediate temperature for about approximately 16 hours; releasing the low pressure and heating the capacitor to a peak temperature of between about approximately 125° C. and about approximately 180° C.; and maintaining the peak temperature for one to four hours or so.

Another example is a method for producing a high temperature resistant metallized polypropylene capacitor, consisting of the steps of depositing metal electrodes on polypropylene dielectric film; winding the film; applying terminal connections to an exposed end of each of said electrode thereby forming a capacitor; and curing the capacitor by steps consisting of placing the capacitor in a low pressure environment, and gradually heating the capacitor to a peak temperature of at least about approximately 115° C.

Yet another example is a method for extending the temperature range of a conventionally fabricated metallized polypropylene capacitor, consisting of placing the capacitor in a low pressure environment of not more than 10 Torr and preferably not more than 1 Torr, and gradually heating the capacitor to a peak temperature at least about approximately 10° C. higher than the desired operating temperature and greater than about approximately 115° C. (388.15 K). The low pressure can be released after a substantial portion of the temperature excursion has been accomplished, and the temperature excursion finished at ambient pressure.

Since other modifications and changes varied to fit particular operating conditions and environments or designs will be apparent to those skilled in the art, the invention is not considered limited to the examples chosen for purposes of disclosure, and covers changes and modifications which do not constitute departures from the true scope of this invention.

Having thus described the invention, what is desired to be protected by letters patents is presented in the subsequently appended claims.

I claim:

1. A monolithic polymer capacitor produced by the process comprising the steps of:
   vapor depositing at least two metal electrodes on polypropylene dielectric film;
   winding said film so as to insulate said metal electrodes from each other;
   applying a terminal connection to an exposed end of each said electrode thereby forming a capacitor; and
   curing said capacitor by steps comprising
      placing said capacitor in a low pressure environment, and
      gradually heating said capacitor to a peak temperature between about approximately 130° C. (403.15 K) and about approximately 200° C. (473.15 K) and maintaining said peak temperature for a period of time
   wherein said capacitor has a maximum operating temperature in excess of 120° C. for direct current voltages between 400 and 1200 Volts (V).

2. The monolithic polymer capacitor of claim 1 wherein said polypropylene dielectric film is commercially available.

3. The monolithic polymer capacitor of claim 1 wherein said capacitor has a capacitance of between 0.001 and 800 microfarads ($\mu$F).

4. The monolithic polymer capacitor of claim 1 wherein said capacitor is heated at a rate of not more than about approximately 5° C./$_{hour}$ and a peak rate of not more than 30° C./hour.

5. The monolithic polymer capacitor of claim 1 wherein said period of time is not less than about approximately 1 hour.

6. The monolithic polymer capacitor of claim 1 wherein the step of winding further comprises using a standard capacitor winding machine.

7. The monolithic polymer capacitor of claim 6 wherein said capacitor winding machine has continuous tension control.

8. The monolithic polymer capacitor of claim 1 wherein said step of curing the capacitor by heating said capacitor lasts for a period of about approximately four (4) hours.

9. The monolithic polymer capacitor of claim 1 wherein said peak temperature is between about approximately 135° C. (408.15 K) and about approximately 180° C. (453.15 K).

10. The monolithic polymer capacitor of claim 1 wherein said peak temperature is at least about approximately 10° C. higher than the desired operating temperature.

11. The monolithic polymer capacitor of claim 1 wherein said low pressure environment is maintained at not more than about 10 Torr.

12. The monolithic polymer capacitor of claim 1 wherein said low pressure environment is maintained at not more than about 2 Torr.

13. The monolithic polymer capacitor of claim 1 wherein said low pressure environment is maintained at not more than about 1 Torr.

14. The monolithic polymer capacitor of claim 1 wherein said steps of said curing said capacitor comprise the sub steps of:
- placing said capacitor in an oven
- creating said low pressure environment in said oven;
- heating said capacitor to a first intermediate temperature,
- maintaining said first intermediate temperature for about approximately 16 hours;
- heating said capacitor to a second intermediate temperature;
- maintaining said second intermediate temperature for about approximately 16 hours;
- heating said capacitor to said peak temperature of between about approximately 130° C. and about approximately 180° C.; and
- maintaining said peak temperature for not less than about approximately one hour.

15. The monolithic polymer capacitor of claim 14 wherein die step of curing said capacitor further campuses, after the sub step of maintaining said second intermediate temperature, the further sub step of:
- releasing said low pressure environment.

16. The monolithic polymer capacitor of claim 14 wherein said low pressure environment has a pressure of not greater than about approximately 10 Torr.

17. The monolithic polymer capacitor of claim 14 wherein said low pressure environment has a pressure of not greater than about approximately 2 Torr.

18. The monolithic polymer capacitor of claim 14 wherein said low pressure environment has a pressure of not greater than about approximately 1 Torr.

19. The monolithic polymer capacitor of claim 14 wherein said first intermediate temperature is about approximately 70° C.

20. The monolithic polymer capacitor of claim 14 wherein said second intermediate temperature is about approximately 105° C.

21. A method for producing a high temperature resistant metallized polypropylene capacitor, comprising the steps:
- depositing metal electrodes on polypropylene dielectric film;
- winding said film so as to insulate said metal electrodes from each other;
- applying terminal connections to an exposed end of each of said electrode thereby forming a capacitor; and
- curing said capacitor such that said capacitor has a maximum operating temperature in excess of 120° C. for direct current voltages between 400 and 1200 Volts (V), by steps comprising
- placing said capacitor in a low pressure environment, and
- gradually heating said capacitor to a peak temperature of at least about approximately 120° C. (393.15 K).

22. The method for producing a high temperature resistant metallized polypropylene capacitor according to claim 21 wherein the temperature of said capacitor is raised at an average rate of not more than about approximately 5° C./hour and a peak ratio of not more than 30° C./hour.

23. The method of claim 21 wherein said low pressure environment has a pressure of not greater than about approximately 10 Torr.

24. The method of claim 21, wherein said low pressure environment has a pressure of not greater than about approximately 2 Torr.

25. The method of claim 21, wherein said low pressure environment has a pressure of not greater than about approximately 1 Torr.

26. The method for producing a high temperature resistant metallized polypropylene capacitor according to claim 21, wherein said peak temperature is between about approximately 130° C. (403.15 K) and about approximately 180° C. (453.15 K) and is at least about approximately 10° C. higher than the desired operating temperature.

27. A method for extending the temperature range of a conventionally fabricated metallized polypropylene capacitor, comprising the step of:
- placing said capacitor in a low pressure environment of not more than 10 Torr, and
- gradually heating said capacitor to a peak temperature at least about approximately 10° C. higher than the desired operating temperature and greater than about approximately 120° C. (393.15 K).

28. The method for extending the temperature rage of a conventionally fabricated metallized polypropylene capacitor according to claim 27 wherein said peak temperature is between about approximately 130° C. (403.15 K) and about approximately 180° C. (453.15 K).

29. The method for extending the temperature range of a conventionally fabricated metallized polypropylene capacitor according to claim 27 wherein said capacitor is heated at an average rate of not more than about approximately 5° C./$_{hour}$ and a peak rate of not more than 30° C./$_{hour}$.

30. A monolithic polymer capacitor, said capacitor comprising:
- a polypropylene dielectric film;
- first and second electrodes bonded to said film; and
- wherein said capacitor has a maximum operating temperature in excess of 125° C. for direct current voltages between 400 and 1200 Volts (V).

* * * * *